US008558755B2

(12) United States Patent
Kharrati et al.

(10) Patent No.: US 8,558,755 B2
(45) Date of Patent: Oct. 15, 2013

(54) LARGE SCALE LED DISPLAY SYSTEM

(75) Inventors: Hamid Kharrati, LaJolla, CA (US);
Robert J. Sefton, San Diego, CA (US);
Sheldon Lee Black, LaMesa, CA (US);
Daniel S. Kline, Encinitas, CA (US);
Anthony D. Barghini, Encinitas, CA (US)

(73) Assignee: ADTI Media, LLC140

( * ) Notice: Subject to any disclaimer, the term of this patent is extended or adjusted under 35 U.S.C. 154(b) by 1124 days.

(21) Appl. No.: 12/001,276

(22) Filed: Dec. 11, 2007

(65) Prior Publication Data

US 2009/0146931 A1    Jun. 11, 2009

(51) Int. Cl.
*G09G 5/00*    (2006.01)

(52) U.S. Cl.
USPC ............................................. 345/1.1; 345/82

(58) Field of Classification Search
USPC ............................................. 345/1.1–3.4, 82
See application file for complete search history.

(56) References Cited

U.S. PATENT DOCUMENTS

| | | |
|---|---|---|
| 4,782,336 A | 11/1988 | Bailey |
| 4,887,074 A | 12/1989 | Simon et al. |
| 5,160,200 A | 11/1992 | Cheselske |
| 5,184,114 A | 2/1993 | Brown |
| 5,287,353 A | 2/1994 | Buda et al. |
| 5,317,344 A | 5/1994 | Beaman et al. |
| 5,406,176 A | 4/1995 | Sugden |
| 5,410,328 A | 4/1995 | Yoksza et al. |
| 5,420,482 A | 5/1995 | Phares |
| 5,523,769 A * | 6/1996 | Lauer et al. ..................... 345/1.3 |
| 5,564,819 A | 10/1996 | Yamaguchi |
| 5,636,303 A | 6/1997 | Che et al. |
| 5,900,850 A | 5/1999 | Bailey et al. |
| 5,924,784 A | 7/1999 | Chliwnyj et al. |
| 6,009,650 A | 1/2000 | Lamparter |
| 6,016,038 A | 1/2000 | Mueller et al. |
| 6,104,414 A * | 8/2000 | Odryna et al. ................ 345/536 |
| 6,118,426 A | 9/2000 | Albert et al. |
| 6,150,774 A | 11/2000 | Mueller et al. |
| 6,211,626 B1 | 4/2001 | Lys et al. |

(Continued)

FOREIGN PATENT DOCUMENTS

| | | |
|---|---|---|
| EP | 1550947 A2 | 7/2005 |
| GB | 2143983 | 2/1985 |

(Continued)

OTHER PUBLICATIONS

European Search Report dated Jan. 27, 2010, Reference No. P91157EP00, Application No./Patent No. 05789062.6-1231 / 1784799 PCT/US2005029599.

(Continued)

*Primary Examiner* — Amare Mengistu
*Assistant Examiner* — Premal Patel
(74) *Attorney, Agent, or Firm* — McAndrews, Held & Malloy, Ltd.

(57) ABSTRACT

A system distributes data in a robust manner to a large scale LED display formed of a number of display panels. The system includes a plurality of data hubs wherein each display panel is connected to at least two data hubs to receive redundant pixel data for each pixel of the panel. Each data hub is further connected to at least two panels of the display to provide pixel data for each pixel of the panels to which the data hub is connected.

26 Claims, 11 Drawing Sheets

(56) References Cited

U.S. PATENT DOCUMENTS

| | | | |
|---|---|---|---|
| 6,362,801 B1 | 3/2002 | Yuhara | |
| 6,435,459 B1 | 8/2002 | Sanderson et al. | |
| 6,498,672 B2 | 12/2002 | Saitoh | |
| 6,519,395 B1 | 2/2003 | Bevan et al. | |
| 6,608,453 B2 | 8/2003 | Morgan et al. | |
| 6,737,983 B1 | 5/2004 | Temple | |
| 6,777,891 B2 | 8/2004 | Lys et al. | |
| 6,788,011 B2 | 9/2004 | Mueller et al. | |
| 6,806,659 B1 | 10/2004 | Mueller et al. | |
| 6,816,143 B1* | 11/2004 | Lambert | 345/93 |
| 6,998,650 B1 | 2/2006 | Wu | |
| 7,071,620 B2 | 7/2006 | Devos et al. | |
| 7,221,104 B2 | 5/2007 | Lys et al. | |
| 7,253,566 B2 | 8/2007 | Lys et al. | |
| 7,319,408 B2 | 1/2008 | Temple | |
| 7,616,635 B2* | 11/2009 | Slaight | 370/390 |
| 2002/0003592 A1* | 1/2002 | Hett et al. | 349/58 |
| 2003/0051098 A1* | 3/2003 | Brant et al. | 711/114 |
| 2003/0117347 A1 | 6/2003 | Hunter et al. | |
| 2003/0146882 A1* | 8/2003 | Ogino et al. | 345/1.1 |
| 2004/0008155 A1 | 1/2004 | Cok | |
| 2004/0222941 A1* | 11/2004 | Wong et al. | 345/1.1 |
| 2005/0017922 A1* | 1/2005 | Devos et al. | 345/6 |
| 2005/0052375 A1 | 3/2005 | Devos et al. | |
| 2005/0264471 A1* | 12/2005 | Yamazaki et al. | 345/1.1 |
| 2006/0039142 A1 | 2/2006 | Temple | |
| 2006/0132048 A1 | 6/2006 | Popovich | |
| 2006/0164587 A1* | 7/2006 | Oh | 349/152 |
| 2006/0241878 A1 | 10/2006 | Jung | |
| 2006/0256033 A1* | 11/2006 | Chan et al. | 345/1.1 |
| 2007/0115666 A1 | 5/2007 | Thomas et al. | |
| 2007/0241988 A1* | 10/2007 | Zerphy et al. | 345/1.1 |
| 2007/0279314 A1* | 12/2007 | Brown | 345/1.1 |
| 2008/0316188 A1* | 12/2008 | Kim et al. | 345/204 |
| 2009/0027303 A1* | 1/2009 | Arthur et al. | 345/1.3 |
| 2009/0096711 A1* | 4/2009 | Jang et al. | 345/1.3 |

FOREIGN PATENT DOCUMENTS

| | | |
|---|---|---|
| GB | 2240686 A | 7/1991 |
| JP | 2003092195 A | 3/2003 |
| JP | 2006005830 A | 1/2006 |
| JP | 2007298753 A | 11/2007 |
| WO | 2007138494 A1 | 12/2007 |
| WO | 2010059431 A1 | 5/2010 |

OTHER PUBLICATIONS

Extended European Search Report dated Dec. 7, 2010, Application No. EP-08858504, Supplementary European Search Report and European Search Opinion.

Extended European Search Report dated Dec. 7, 2010, Application No. EP-08859575, Supplementary European Search Report and European Search Opinion.

International Bureau, International Preliminary Report on Patentability and Written Opinion of the International Searching Authority, dated Jun. 24, 2010, International Application No. PCT/US2008/085320.

International Bureau, International Preliminary Report on Patentability and Written Opinion of the International Searching Authority, dated Jun. 24, 2010, International Application No. PCT/US2008/085315.

International Bureau, International Preliminary Report on Patentability and Written Opinion of the International Searching Authority, dated Jun. 24, 2010, International Application No. PCT/US2008/085313.

International Bureau, International Preliminary Report on Patentability and Written Opinion of the International Searching Authority, dated Jun. 24, 2010, International Application No. PCT/US2008/085316.

International Searching Authority, International Search Report and Written Opinion of the International Searching Authority, dated Jan. 30, 2009, International Application No. PCT/US/2008/85315.

International Searching Authority, International Search Report and Written Opinion of the International Searching Authority, dated Feb. 3, 2009, International Application No. PCT/US/2008/85316.

International Searching Authority, International Search Report and Written Opinion of the International Searching Authority, dated Feb. 5, 2009, International Application No. PCT/US/2008/85320.

International Searching Authority, International Search Report and Written Opinion of the International Searching Authority, dated Feb. 9, 2009, International Application No. PCT/US/2008/85313.

* cited by examiner

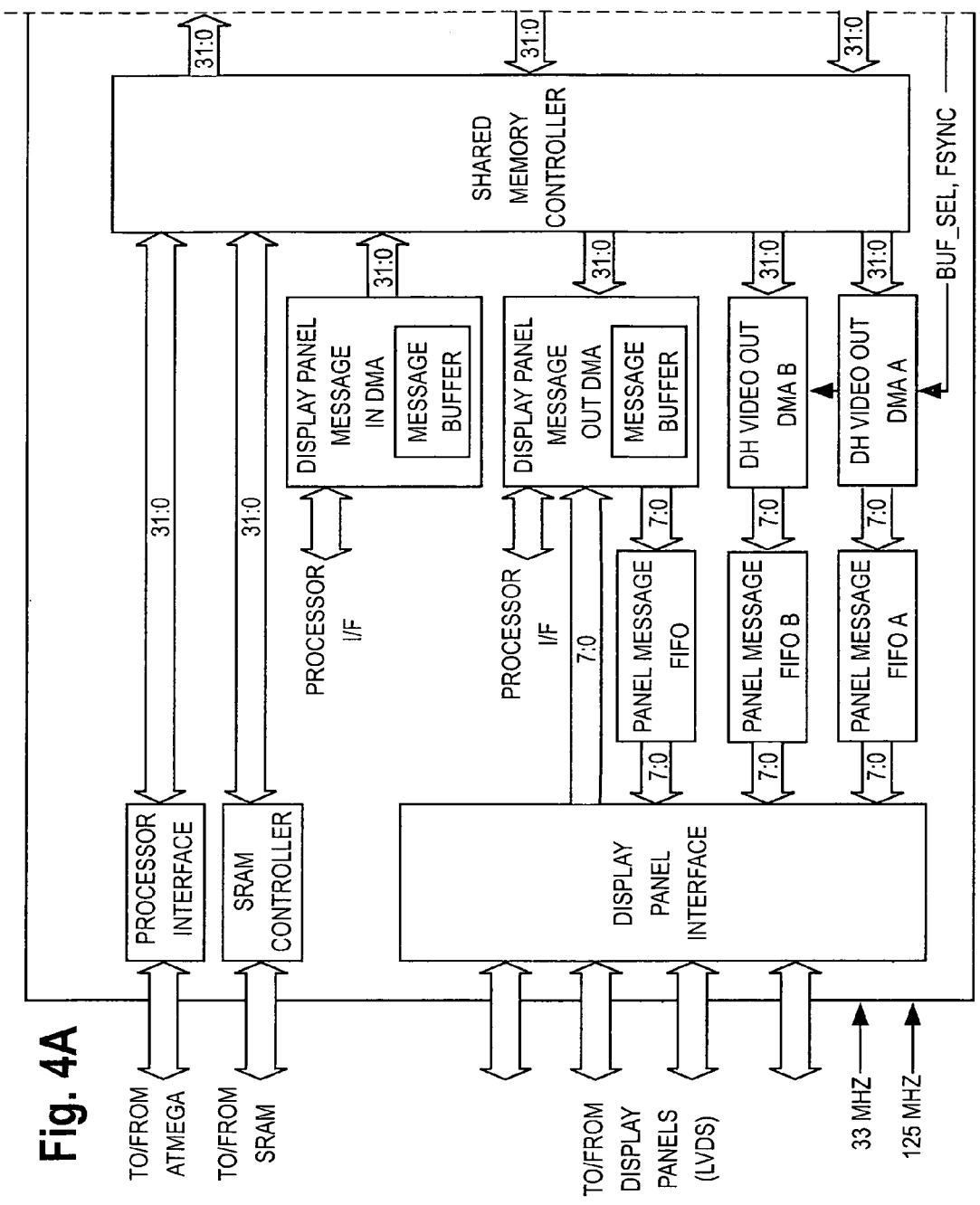

| FIG. 6A |
|---|
| FIG. 6B |

LARGE SCALE LED DISPLAY SYSTEM

CROSS-REFERENCE TO RELATED APPLICATIONS

The present application is related to co-pending patent applications U.S. Ser. No. 12/001,277 entitled "Data And Power Distribution System and Method For A Large Scale Display;" U.S. Ser. No. 12/001,312 entitled "Enumeration System And Method For A LED Display;" and U.S. Ser. No. 12/001,315 entitled "Large Scale LED Display," each filed concurrently herewith.

STATEMENT REGARDING FEDERALLY SPONSORED RESEARCH OR DEVELOPMENT

N/A

TECHNICAL FIELD

The present invention is directed to a large scale LED display system and more particularly to a system for distributing data to a large scale LED display.

BACKGROUND OF THE INVENTION

LED displays are known that are formed of a number of LED modules wherein each LED module is used for one pixel of the display. Each of the LED modules has a number of different color LEDs, the intensities of which are controlled to generate pixels of a large number of different colors. Examples of these known types of LED displays are shown in Phares U.S. Pat. No. 5,420,482 and Yoksza et al. U.S. Pat. No. 5,410,328.

In both Phares U.S. Pat. No. 5,420,482 and Yoksza et al. U.S. Pat. No. 5,410,328, the LED modules are connected in series in a string or daisy chain configuration wherein a data stream is input to one LED module that extracts a subset of data for its module from the data stream and passes the remaining portion of the data stream or the entire data stream to the next LED module in the series. Lys et al. U.S. Pat. No. 7,253,566 and Mueller et al. U.S. Pat. No. 6,016,038 respectively disclose systems for lighting or illumination that include LED lighting units or nodes connected in a bidirectional daisy chain configuration or a binary tree configuration with two nodes connected to the output of a single node. In these known systems a single processor supplies a data stream to a LED module or node which in turn sends the data stream to the next module or node in the chain. If communications between the processor and the LED module fail, the system becomes inoperable.

BRIEF SUMMARY OF THE INVENTION

In accordance with the present invention, the disadvantages of prior systems for distributing data to a LED display are overcome. In accordance with the present invention, a system and method are provided for distributing data to a large scale LED display that is much more robust than prior systems.

In accordance with one feature of the present invention, a display system includes a plurality of display panels, wherein each panel is formed of a two dimensional array of LED pixel modules and each pixel module has a housing supporting a plurality of multi-color LEDs and a controller that is responsive to received pixel data to control the intensity of the LEDs of the module. The display system also includes a plurality of data hubs, each display panel being connected to at least two data hubs to receive redundant pixel data for each pixel of the panel wherein each data hub is connected to a different pixel module of the panel and each data hub is connected to at least two panels of the display to provide pixel data for each pixel of the panels to which the data hub is connected.

In accordance with another feature of the present invention, each data hub is connected to at least two pixel modules of each panel such that at least four pixel modules of each panel directly receive redundant pixel data for each pixel of the panel.

In accordance with a further feature of the present invention, each of the pixel modules of the panel that directly receive redundant data from the data hubs distribute the received data to a plurality of other pixel modules of the panel which in turn distributes the received data to a plurality of still other pixel modules of the panel. The distribution of the data continues until all of the data for a panel is distributed to all of the panel's pixel modules.

In accordance with still a further feature of the present invention, a plurality of pixel modules of the display are capable of receiving data directly from any one of four other pixel modules.

These and other advantages and novel features of the present invention, as well as details of an illustrated embodiment thereof, will be more fully understood from the following description and drawings.

DETAILED DESCRIPTION OF THE INVENTION

Figure 1:
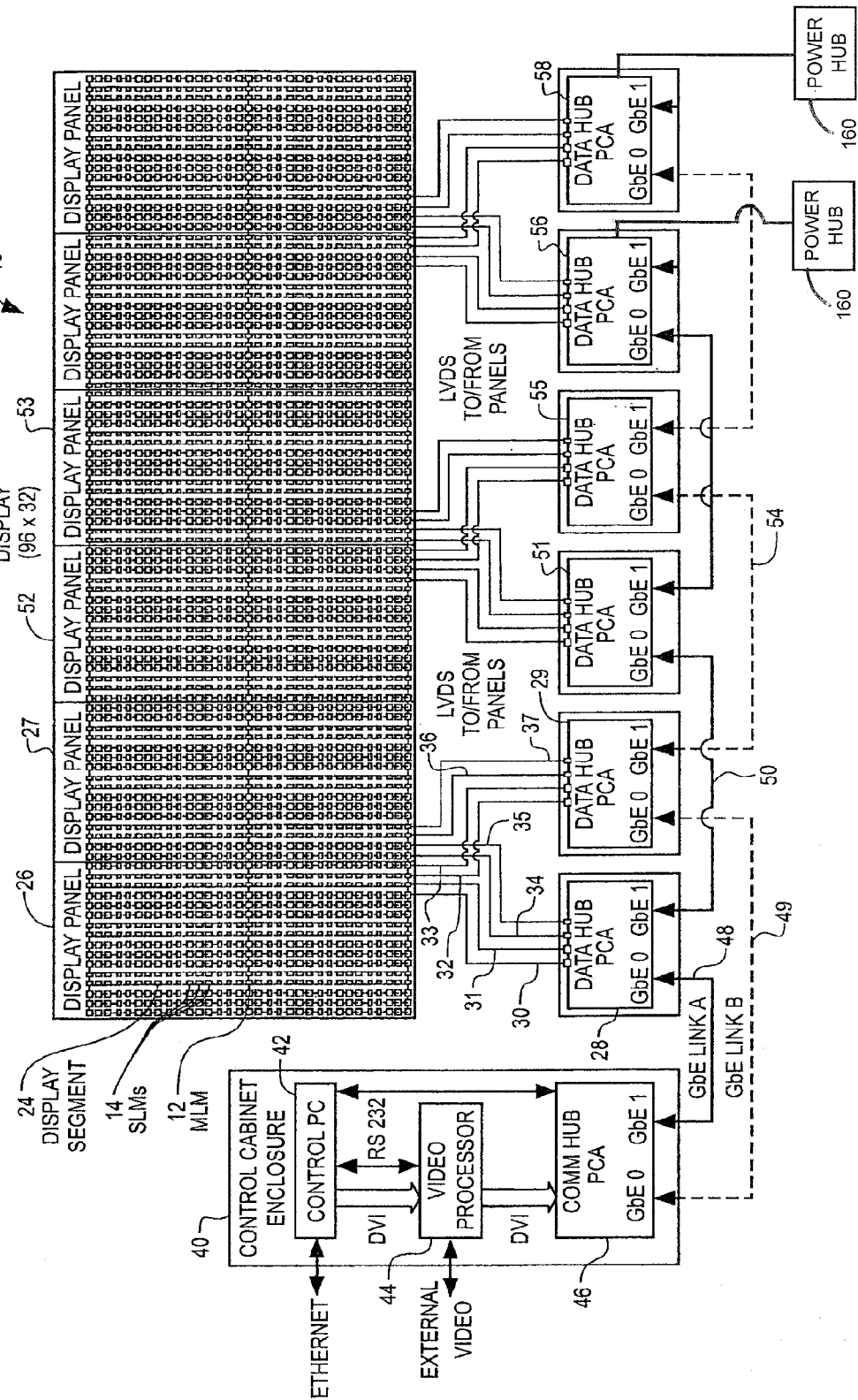
FIG. 1 is a block diagram illustrating a LED display system in accordance with the present invention.

A large scale LED display 10 in accordance with the present invention, for indoor or outdoor use, has height by width dimensions on the order of 3 m×6 m to 24 m×32 m or approximately 10 ft.×20 ft. to 80 ft.×105 ft. Although, it should be appreciated, that the present invention can be used for displays that are larger or smaller as well. A display that is approximately 24 m×32 m has 480 pixels×640 pixels or a total of 307,200 pixels. Because such a display 10 is so large, only a portion of the display is depicted in FIG. 1. Moreover, because of its size a robust display is desired. The data and power distribution system and method of the present invention, as described in detail below, provide such a robust display wherein failure of a single component will not render the display or even a row or column of the display inoperable.

Figure 2:
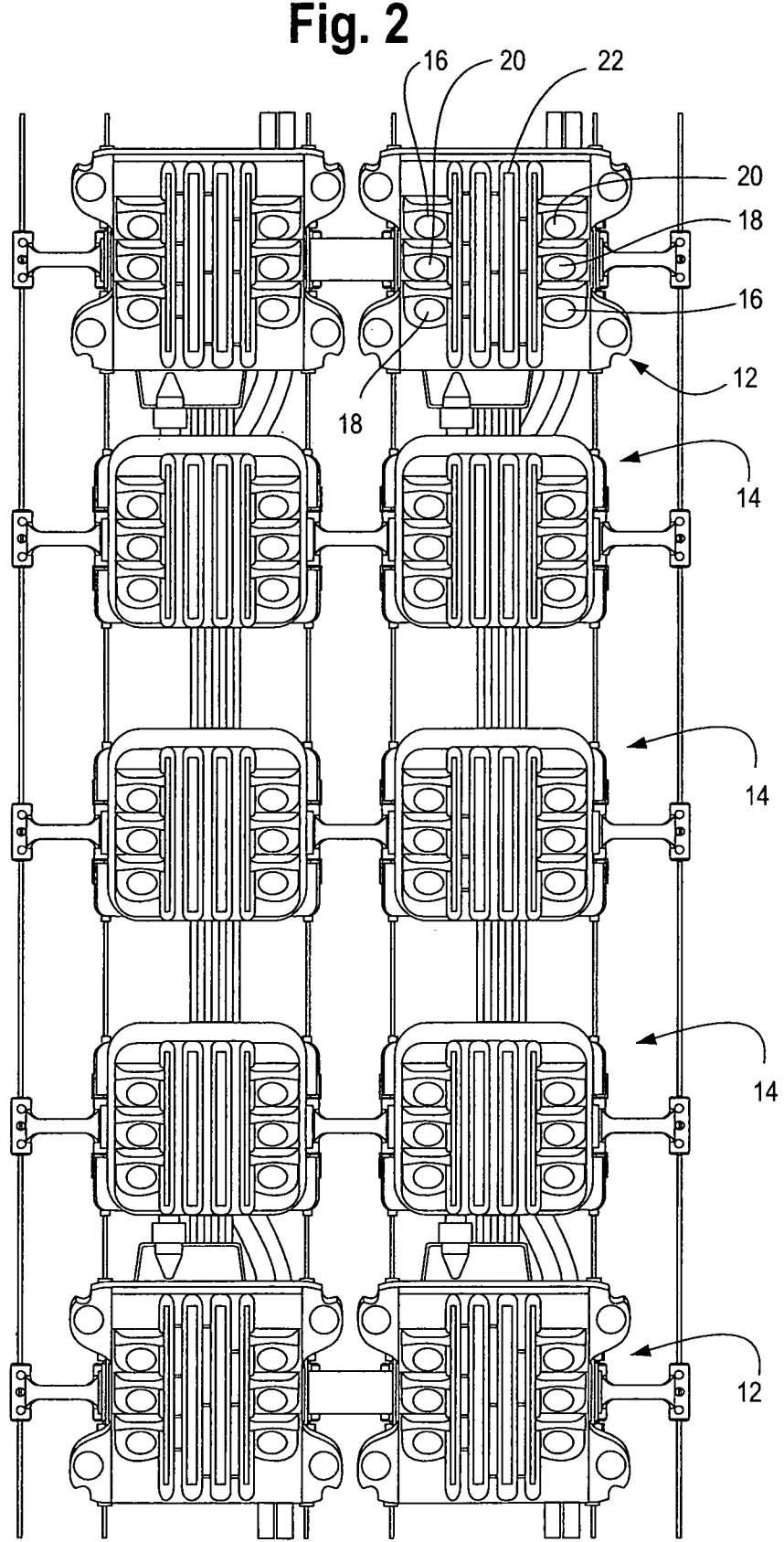
FIG. 2 is a partial front view of a portion of the LED display depicted in FIG. 1.

Each pixel of the display 10 is generated by a module 12, 14 having two red LEDs 16, two blue LEDs 18 and two green LEDs 20 mounted in a housing 22 as shown in FIG. 2. Circuitry, described below, within the module housing 22 controls the intensities of the red, green and blue LEDs in order to generate pixels of a large number of different colors as is well known in the art. Although each of the modules 12, 14 is depicted in FIG. 2 having pairs of red, green and blue LEDs, the number of red, green and blue LEDs can vary depending upon the flux density of the individual LEDs and/or the spacing between the individual modules. Details of the mechanical and/or structural features of the modules 12, 14 and the support structure for the display 10, are disclosed in co-pending patent application Ser. No. 12/001,315, entitled "Large Scale LED Display," filed concurrently herewith and incorporated herein by reference.

There are two types of pixel modules employed in the display 10, master LED modules 12 and slave LED modules 14. Each master module is associated with a group of slave modules in a segment 24 of the display. In accordance with a preferred embodiment of the present invention, each segment 24 has one master module and fifteen slave modules to generate 16 pixels of the display. It should be apparent, however, that the number of slave modules can vary from zero to any number depending upon which aspects of the invention are used. In a preferred embodiment, the segments 24 of the display 10 are linear, extending in a column of the display 10. However, the segments can alternatively extend in the rows of the display. Moreover, the segments need not be linear but can be formed of a block of modules that include at least one master LED module. For a 480×640 display having linear segments of sixteen pixels, there are thirty segments 24 in each column of the display. The segments 24 are preferably aligned so that each master module is in a row of master modules. As such, for a 480×640 display there are thirty rows of master modules with 640 master modules in each of those rows and fifteen rows of slave modules between each of the rows of master modules.

Each master LED module 12 is connected to the adjacent master LED modules in its row to allow direct communication therebetween. Each master module is also connected to the master modules of adjacent segments in its column to allow direct communication therebetween. As such, a master module is capable of communicating directly with up to four other master modules as well as each of the fifteen slave modules in the master module segment.

The display 10 is arranged in a number of panels 26, 27 for easier deployment. In accordance with a preferred embodiment of the present invention, each panel has sixteen columns of LED modules, wherein a full height panel has 480 rows of LED modules, although, each of the display panels can have any height and width desired. A 480×640 display having display panels with sixteen columns will employ forty display panels. Each display panel 26 can receive redundant data to control all of the pixels of the panel 26 from two data hubs, a primary data hub 28 and a redundant data hub 29. Each of the data hubs can provide the data for all of the pixels of two adjacent display panels 26 and 27 by providing two data streams, one data stream for the panel 26 and the other data stream for the panel 27. Moreover, each data hub is capable of providing redundant data to each display panel on two data cables. As such, the data hub 28 provides all of the data for the pixels of the display panel 26 on a data cable 30 and can provide redundant data for the panel 26 on a data cable 31. The display panel 26 can receive the same data for all of the pixels of the panel from the data hub 29 on data cable 32 or data cable 33. As such, the display panel 26 is capable of receiving data on any one of four data cables 30, 31, 32 and 33 from the two data hubs 28 and 29. The data hub 28 also provides all of the data for the pixels of the display panel 27 on a data cable 34 and can provide redundant data for the panel 27 on a data cable 35. The display panel 27 receives the same data from the data hub 29 on data cable 36 or data cable 37. As such, the display panel 27 is capable of receiving redundant data on any one of four data cables 34, 35, 36 and 37.

The redundant data streams received by a display panel 26 on the four data cables 30-33 are input to four respective master LED modules. However, in a preferred embodiment only one of the four redundant inputs is active to carry pixel data, at one time. A primary data hub only enables the redundant connection if the existing connection fails. Moreover, the redundant data hub only sends data to a panel if it detects that the primary data hub is no longer driving the panel. Each of the master modules receiving a data stream extracts the data intended for the master module and the associated slave modules in its segment. Each of the master modules receiving a data stream then outputs the data stream to the adjacent master modules in its row and to the master modules in adjacent segments as discussed in detail below. Each master module could strip off the data for its segment from a received data stream and send only the remaining portion of the data stream on to other master modules. However, in a preferred embodiment, each master module does not strip off its data from the data stream but acts as a repeater passing the entire received data stream directly to up to three other master modules after extracting a copy of the data for its segment from the data stream. The data stream for a display panel 26 is thus distributed throughout the panel 26 by each of the master modules 12. Because a master module 12 can receive a data stream from up to four other master modules 12, failure of one or two master modules will not render the display or even an entire column or row of the display inoperable as in prior art systems. Failure of one master module will affect only sixteen of the 307,200 pixels of a 480×640 pixel display 10. Failure of one slave 14 module will not affect any other modules of the display 10.

The system for controlling the display 10, as shown in FIG. 1, includes a main controller 40. The main controller 40 includes a central processing unit (CPU) 42 and associated memory to control and monitor the rest of the display system. The main controller 40 also includes a video processor 44. The video processor 44 may receive uncompressed video or compressed video in any format such as MPEG4 or H.264, etc. The video processor 44 scales the video to the size of the display 10 and provides uncompressed digital video in a conventional raster scan format to a communication hub 46. The communication hub 46 includes a memory such as SRAM and a micro-controller. Raster scan video data is stored in the memory of the communication hub 46. The video data from the communication hub memory is read from the memory and forwarded to the data hubs 28 and 29 column by column in an inverted order such that the data for the bottom most pixel of the first column is transferred to the data hubs first. In one embodiment, each packet of data sent by the communication hub 46 to the data hubs 28 and 29 includes a column header identifying the column number of the data in the packet, followed by a segment header that includes the segment number associated with the data. The segment header may also include a control word that identifies a status request and a pixel count that identifies the number of pixels in a segment. The pixel count indicates the number of bytes of pixel data to follow for each of the modules in a segment. The segment pixel data follows the segment header wherein three bytes of data are sent for each pixel to control the intensities of the respective red, green and blue LEDs of the pixel. In an alternate embodiment, the communication hub or the data hubs can send different types of packets to the display panel wherein the packet includes a packet type identifier. The different type of packets that can be sent include a master module enumeration message; display data and/or control messages; master module status requests; and slave module status requests. Packets that include pixel data include a master module address formed of the master module's column number and segment number and at least one slave module address followed by the LED data for the slave module. It is noted that each master module includes a slave module micro-controller circuit for controlling the LEDs of the master module. The slave module micro-controller in the master module has a slave module address. As such the master module has both a master module address and an associate slave address for its LED micro-controller. The display data packet also includes a command that further identifies the following data as being display data for an individual master or slave module or display data for a segment of modules. This alternative packet structure allows greater flexibility so that different packet types with various commands can be sent to a display panel.

The communication hub 46 sends redundant data streams containing the data for the entire display 10 on a pair of GbE links 48 and 49 that are connected to respective data hubs 28 and 29. Each data hub is responsive to a received data stream to extract the columns of data for the two panels that the data hub controls, the data hub passing the remaining portion or the entire data stream as received on to another data hub. The data stream is thus distributed from data hub to data hub for all of the data hubs in the display system. Specifically, the data hub 28 receives a data stream containing the data for the entire display 10 on the GbE link 48. The data hub 28 extracts the data for columns 1-16 for the display panel 26 and the data for columns 17-32 for display panel 27 and then passes the entire data stream on a GbE link 50 to a data hub 51. The data hub 51 in turn extracts the data for the next pair of display panels in the sequence, display panels 52 and 53 and then passes the entire data stream to the data hub 56. Similarly, the data hub 29 receives the data stream containing the data for the entire display 10 on the GbE link 49. The data hub 29 extracts the data for columns 1-16 for the display panel 26 and the data for columns 17-32 for display panel 27 and then passes the entire data stream on the GbE link 54 to the data hub 55. The data hub 55 extracts the data for the display panels 52 and 53 and passes the entire data stream on to data hub 58. The distribution of the data stream continues to the pairs of data hubs until all of the data hubs controlling the display panel 10 have received their data for a frame of video. The data distribution then continues for all of the frames of a video presentation.

Figure 3:
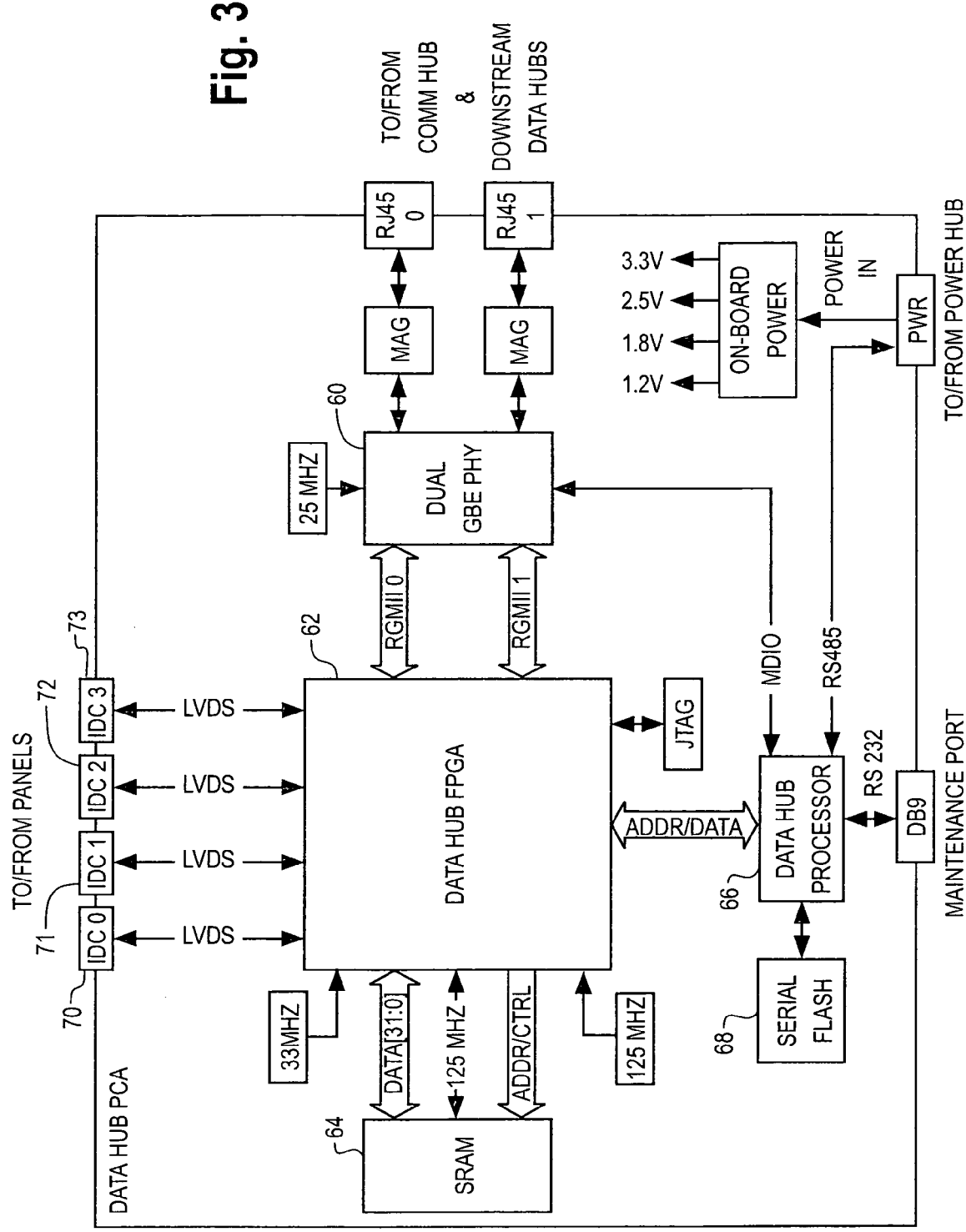
FIG. 3 is a block diagram of a data hub of the LED display system of FIG. 1.

The structure of each data hub is depicted in FIG. 3. Each data hub includes a dual GbE interface 60 which is connected to either the communication hub 46 or an upstream data hub, as well as a downstream data hub as described above. A received data stream is stored by a data hub FPGA 62 in a SRAM 64. The data hub FPGA 62 stores data in and reads data from the SRAM 64 in accordance with software/firmware stored in a flash memory 68. The data hub includes four data ports 70-73 for the LVDS cables that connect the data hub to a pair of display panels. For example, for the data hub 28, the ports 70 and 71 will be connected to the LVDS cables 30 and 31 for two master LED modules of the panel 26 and the data ports 72 and 73 will be connected to the LVDS cables 34 and 35 for two master LED modules of the display panel 27.

Figure 4B:
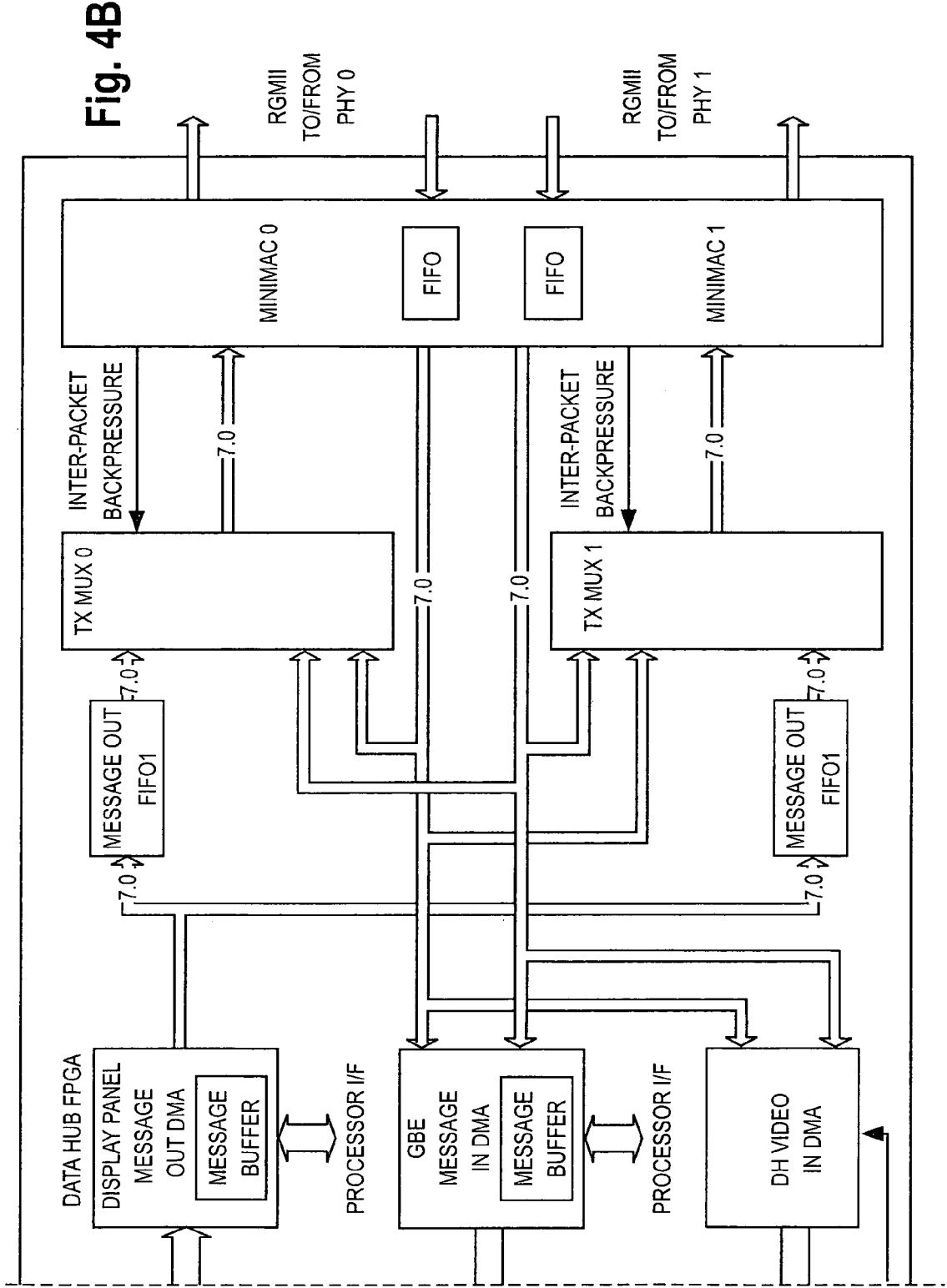
FIG. 4 is a block diagram of the FPGA of the data hub of FIG. 3.
Figure 9:
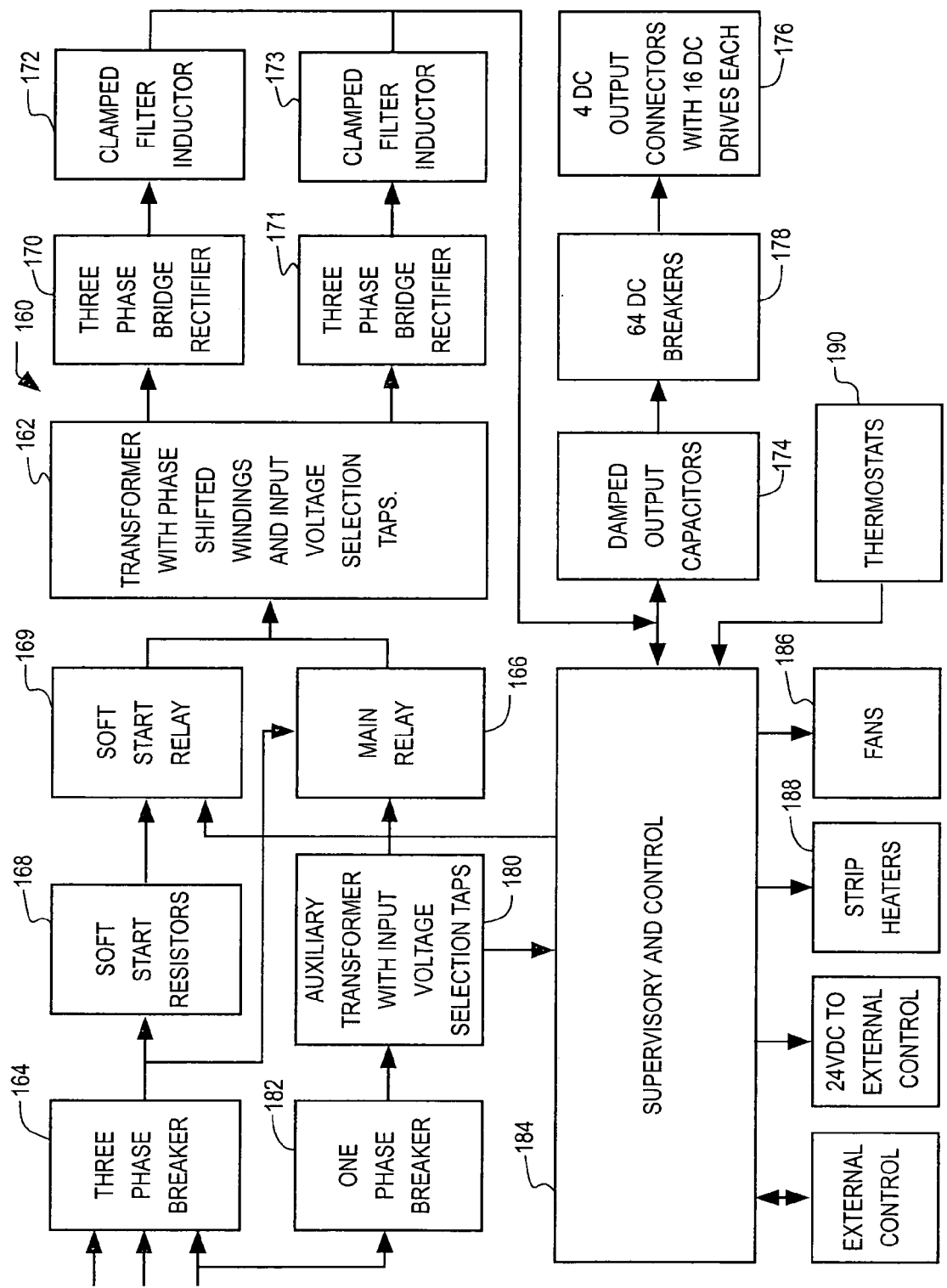
FIG. 9 is a block diagram of a power hub in accordance with one embodiment of the present invention.

Each data hub, in addition to transferring video data to its associated pair of display panels, also performs diagnostics for its display panels. Power is supplied to the data hub from an associated power hub as depicted in FIG. 9. The data hub will monitor the status of its associated power hub and will communicate the status of its associated power hub and its associated display panels to the communication hub 46 of the main controller 40. The data hub FPGA 62, as shown in detail in FIG. 4, includes a shared memory controller with direct memory access (DMA) for transferring video data and messages, for the display panels and main controller 40, in and out of the SRAM 64.

Figure 5:
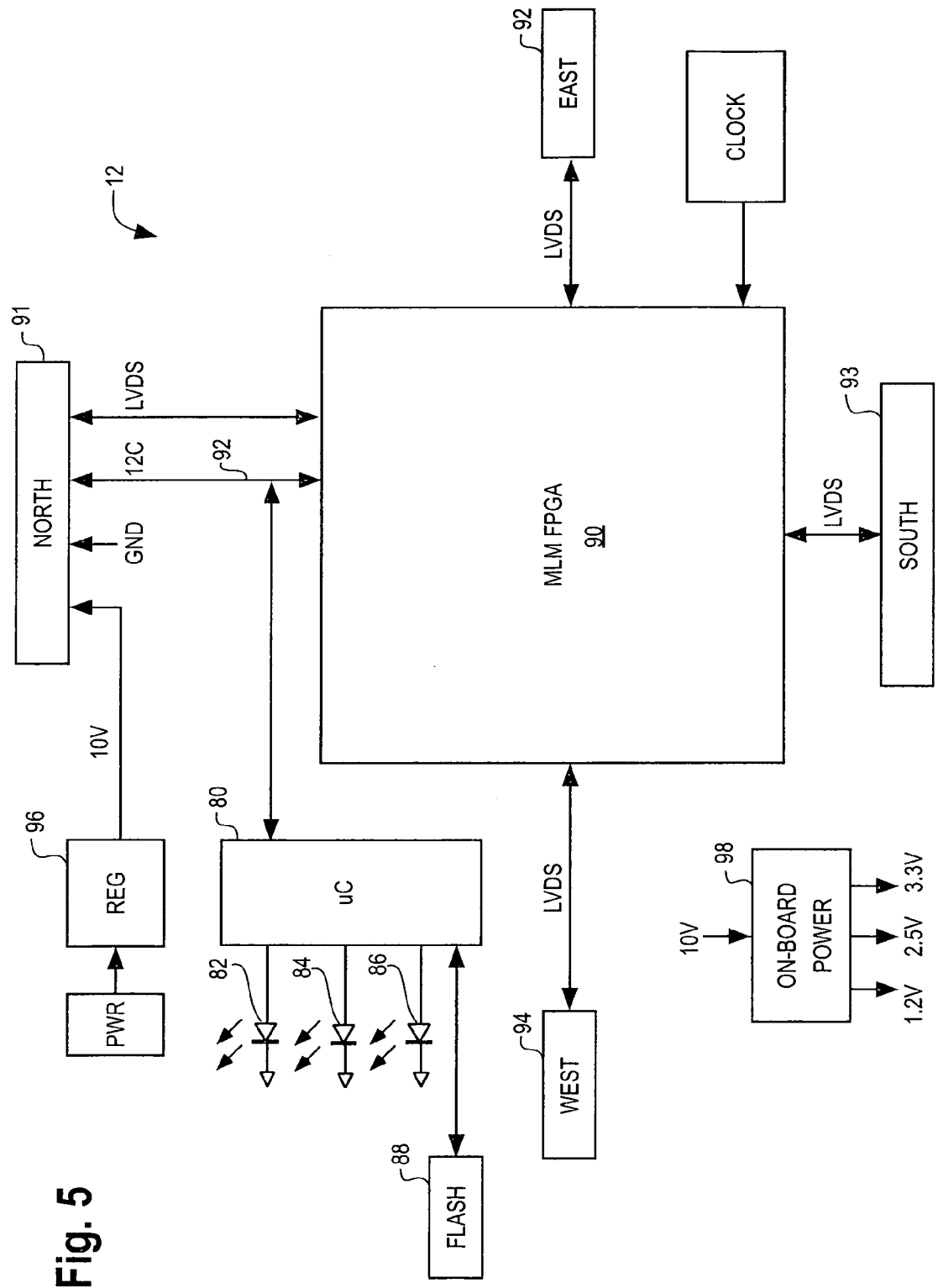
FIG. 5 is a block diagram of a master LED module in accordance with the present invention.
Figures 6, 6A:
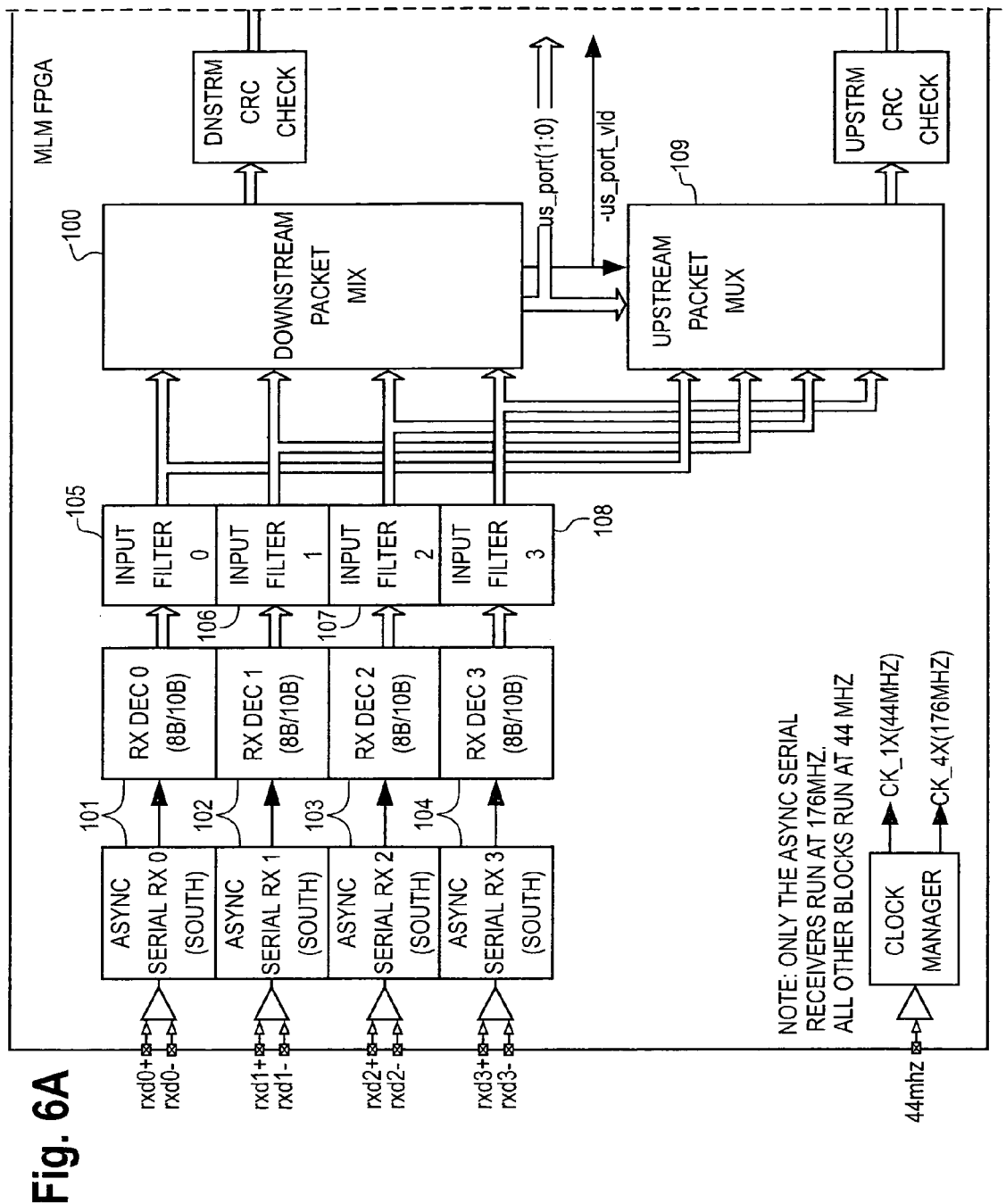
FIG. 6 is a block diagram of the FPGA of the master LED module of FIG. 5.
Figure 6B:
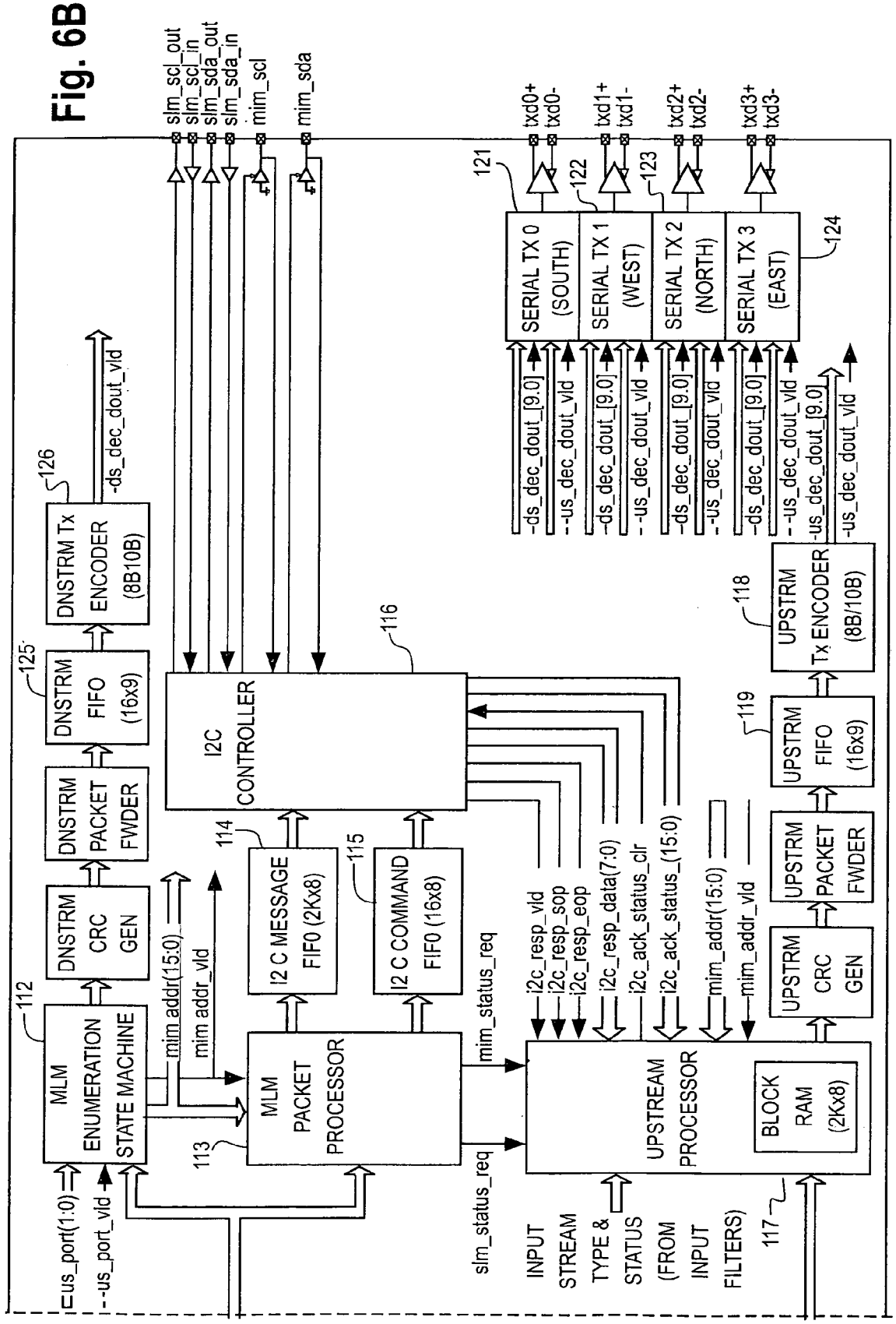
Figure 8:
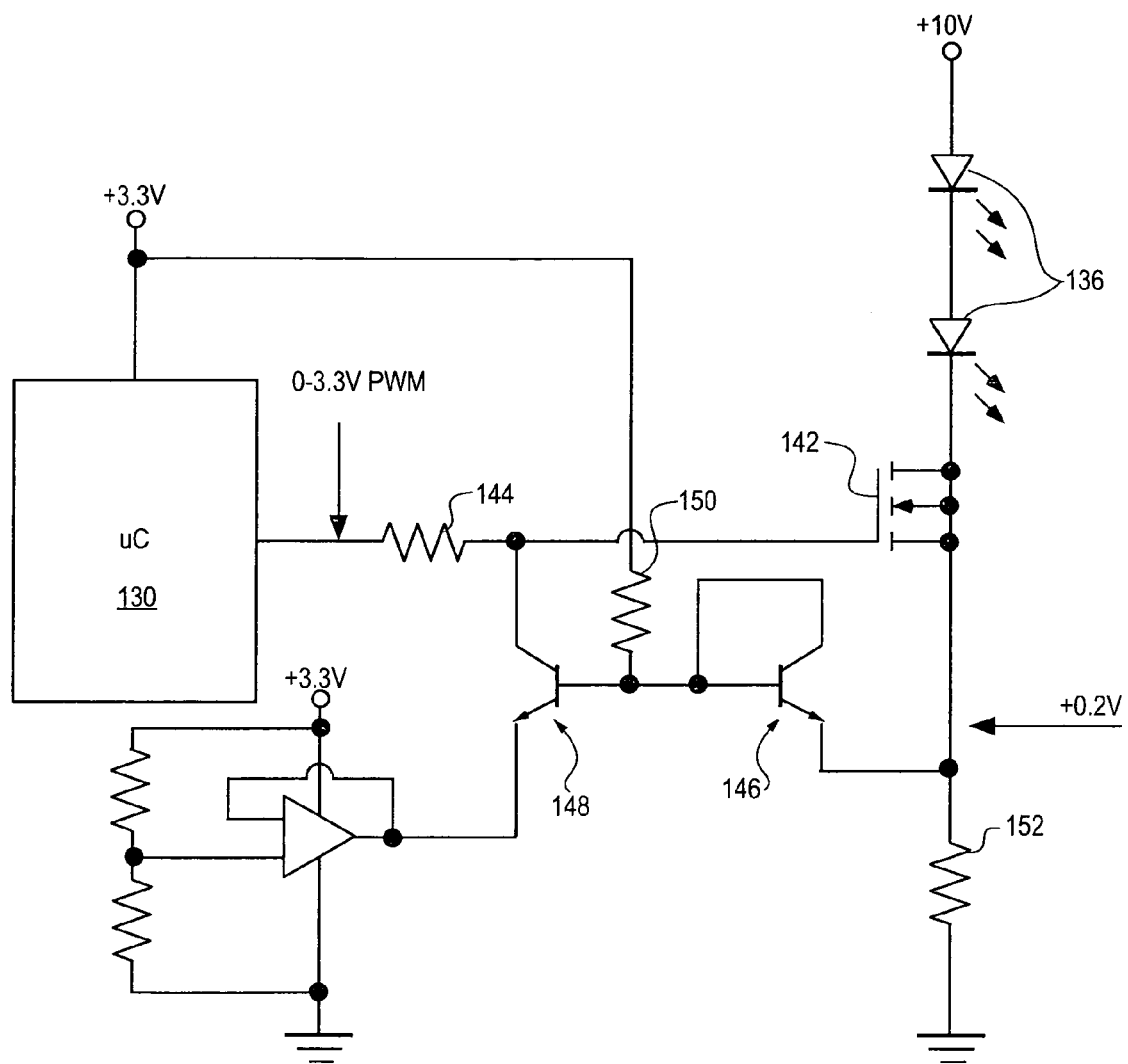
FIG. 8 is a schematic diagram of the pulse width modulation circuit for controlling the intensities of the LEDs of the master and slave modules.

The structure of each of the master LED modules 12 is depicted in FIGS. 5 and 6. Each master module includes a micro-controller 80 and associated drive circuits shown in FIG. 8 for controlling the intensities of the red LEDs 82, green LEDs 84 and blue LEDs 86 of the master module 12. The micro-controller 80 of the master module 12 controls the LEDs in the same manner as described in detail below for the slave modules 14 and the micro-controller 80 has an associated slave module address as noted above. In addition to performing the LED control functions described below with reference to FIG. 8, the micro-controller 80 of the master module 12 programs the master module FPGA controller 90 in accordance with the configuration information stored in a flash memory 88. Each master LED module 12 includes four bidirectional ports, a north port 91, an east port 92, a south port 93 and a west port 94 that are coupled to the module's FPGA controller 90. The controller 90 of the master module communicates with each of its associated slave modules through a common I2C serial bus 92 that is connected to the north port 91. The controller 90 communicates with up to four other master LED modules 12 through respective LVDS cables connected to the ports 91, 92, 93 and 94.

Power for the master LED module 12 is received from power cables coupled to the module 12 from a power hub as shown in FIG. 9 through a data hub. The power received by a master LED module is unregulated and is in the range of 15-36 Volts D.C. A switching voltage regulator 96 in the module 12 steps the input voltage down to a regulated 9V. The rail voltage of 9V is distributed to the slave LED modules in the master module's segment via the north port 91. A block 98 within the master module 12 includes another switching voltage regulator that steps the 9V rail down to 3.3V. A pair of linear voltage regulators also within the block 98 step the 3.3V down to 2.5V and 1.2V for the master LED module FPGA controller 90.

The FPGA controller 90 as shown in FIG. 6 includes a downstream packet multiplexer 100. The downstream packet multiplexer 100 is coupled to the respective data ports 91-94 through input filters asynchronous serial receivers and data decoders 100-104 and input filters 105-108. The receivers and decoders 100-104 receive and recover a data stream on a respective port. Each input filter 105-108 identifies an input stream as a hub stream, i.e. data originating from a data hub for downstream distribution or as a MLM stream, i.e. data originating from a master module such as a response or reply packet to be sent back to a data hub. The input filter 105-108 forwards packets on only if the input stream is valid. The downstream packet multiplexer 100 selects one of the four input ports as the upstream port and forwards packets originating from a data hub from the selected upstream port. If the packet originating from the data hub is an enumeration packet the packet is forwarded to a master module enumeration state machine, e.g. controller/processor 112.

A master module enumeration state machine 112 performs an enumeration process to determine the location of the master LED module within a display panel 26 and thus, an address for the master LED module so that each pixel of the display can be individually addressed to deliver data thereto. The enumeration process performed by the state machine 112 is as follows. On power up of the display 10, the master LED module address registers that hold the segment number and column number of the master module in an enumeration state machine 112 are zero. The first master LED module enumeration message received is generated by the data hub and simply contains the segment number and column number of the hub. The enumeration message from the data hub is sent to only one master LED module. If that master module does not respond to the data hub, the enumeration message will be sent to another master LED module that is directly connected to a data hub. When a master LED module receives an enumeration message it determines its own location, i.e. address, in the display as follows. If the message is received on the master module's south port 93, the enumeration state machine 112 sets the master module's segment number equal to the segment number in the received message incremented by one and sets the master module's column number equal to the column number in the received message. If the enumeration message is received via the west port 94 of the module 12, the enumeration state machine 112 sets the module's segment number equal to the segment number in the received message and sets the master module's column number to the column number in the received message incremented by one. If the enumeration message is received via the north port 91 of the module, the enumeration state machine 112 sets the module's segment number equal to the segment number in the received message decremented by one and sets the column number to the column number in the received message. Finally, if the enumeration message is received via the east port 92, the enumeration state machine 112 sets the module's segment number equal to the segment number in the received message and sets the column number to the column number in the received message as decremented by one. The segment number and column number determined for the master module are stored in the module's address register. The enumeration state machine 112 overwrites the segment number and column number in the received enumeration message with the segment number and column number determined for its module. The enumeration state machine 112 then forwards this revised enumeration message out to three other master modules on three of the bidirectional ports 91-94, i.e. on all of the bidirectional ports 91-94 other than the one port 91-94 on which the enumeration message was first received.

As noted above, one input port 91-94 is selected at any time as the source of display data and messages from a data hub, this selected input port being designated as the upstream port. The downstream packet multiplexer 100 selects as the upstream port, the port whose associated input filter first declares or identifies a valid hub stream, i.e. a stream originating from a data hub. The three remaining ports 91-94 are designated as downstream ports. The upstream port is used in the downstream packet multiplexer 100 to determine which hub stream to forward and is used in an upstream packet multiplexer 109 to determine which ports to monitor for upstream packets. The upstream packet multiplexer 109 forwards MLM streams back towards the data hub. A hub stream that is received via the selected upstream port is forwarded and output from the master LED module via the three downstream ports to three other master LED modules if the upstream port selection is valid and the stream is a valid hub stream. In the reverse direction, MLM reply messages that are received on any of the three downstream ports are output from the module 12 on the selected upstream port if the upstream port selection is valid and the stream is a valid MLM stream.

Two conditions will trigger the downstream packet multiplexer 105 to select a different upstream port: the loss of synchronization from the data decoder associated with the initial upstream port or the stream type being received on the current upstream port changes to a valid MLM stream. When either of these conditions occurs, the downstream packet multiplexer 100 waits 1 msec and performs the upstream port selection process as described above.

A master packet processor 113 processes data hub packets that are addressed to the master module or that have segment and column header fields that are all zeros, i.e. a broadcast message such as used in the enumeration process. After the enumeration process for the display 10 has been completed such that each of the master LED modules has determined its location, i.e. segment number and column number in the display, and has selected an upstream port, a master packet processor 113 of the master LED modules can extract video data for its segment from a data stream. The master packet processor 113 of a master LED module extracts video data for its segment by detecting the master module's address in a received data packet and processes those data packets addressed to the master module. The extracted pixel data is written by the packet processor 113 to a message FIFO 108. At the end of the message a command byte is written to a command FIFO 115. The command FIFO 115 also holds information indicating whether a received message ended with a normal end of packet indication or not and a message byte count indicating the number of bytes in the message FIFO 114 for the received message. An I2C controller 116 reads and processes messages from the message FIFO 114 in response to commands in the command FIFO 115. The controller sends valid messages onto the I2C bus 92 so the message is broadcast to the master module micro-controller 80 and to each of the slave modules of the segment. In addition, the controller 116 sends slave LED module response data or status reply messages to the upstream processor 117.

The upstream processor 117 of the FPGA controller 90 maintains master LED module status information including the status of all four of the receivers 101-104. The upstream processor 117 caches slave module status information received on the I2C bus 92 in an internal RAM. The upstream processor 117 generates the master module and slave module status reply messages in response to strobes from the packet processor 113. The processor 117 also forwards status reply messages received from other master modules via the downstream ports and the upstream packet multiplexer 109 so that the status of each of the modules of a display panel are eventually transmitted back to the data hub for the display panel. Status messages are coupled to an upstream transmitter encoder 118 from the upstream processor 117 via an upstream FIFO 119 wherein the upstream transmitter encoder 118 is coupled to the transmitter 121-124 of the selected upstream port 91-94. Similarly, the state machine 112 couples a hub stream received via the master module's upstream port to the three designated downstream transmitters 121-124 associated with the three downstream ports 91-94 via a downstream FIFO 125 and a downstream transmitter encoder 126.

It should be appreciated that the master LED modules 12 are connected in a mesh configuration wherein each of the master modules 12, except those along an edge of a display panel 26, are connected to four other master LED modules 12. Each of the master modules 12 in this set is capable of receiving data from any of the four other master LED modules to which it is connected. However, each of the master modules 12 responds to a data stream from the one master module that is connected to its upstream port. As described above, a given master module will respond to the data stream from a master module connected to its upstream port to extract data therefrom and to send the received data stream out to the three other master LED modules that are connected to a respective one of its three downstream ports. If a first master module fails and that master module is connected to the upstream port of a given master module, the upstream port of the given master module is changed by its downstream packet multiplexer 100 to a different port so that the given master LED module can receive a data stream from one of the other three master LED modules to which it is connected. Because each master LED module can receive data from up to four other master modules, the data distribution scheme of the present invention is extremely robust.

Figure 7:
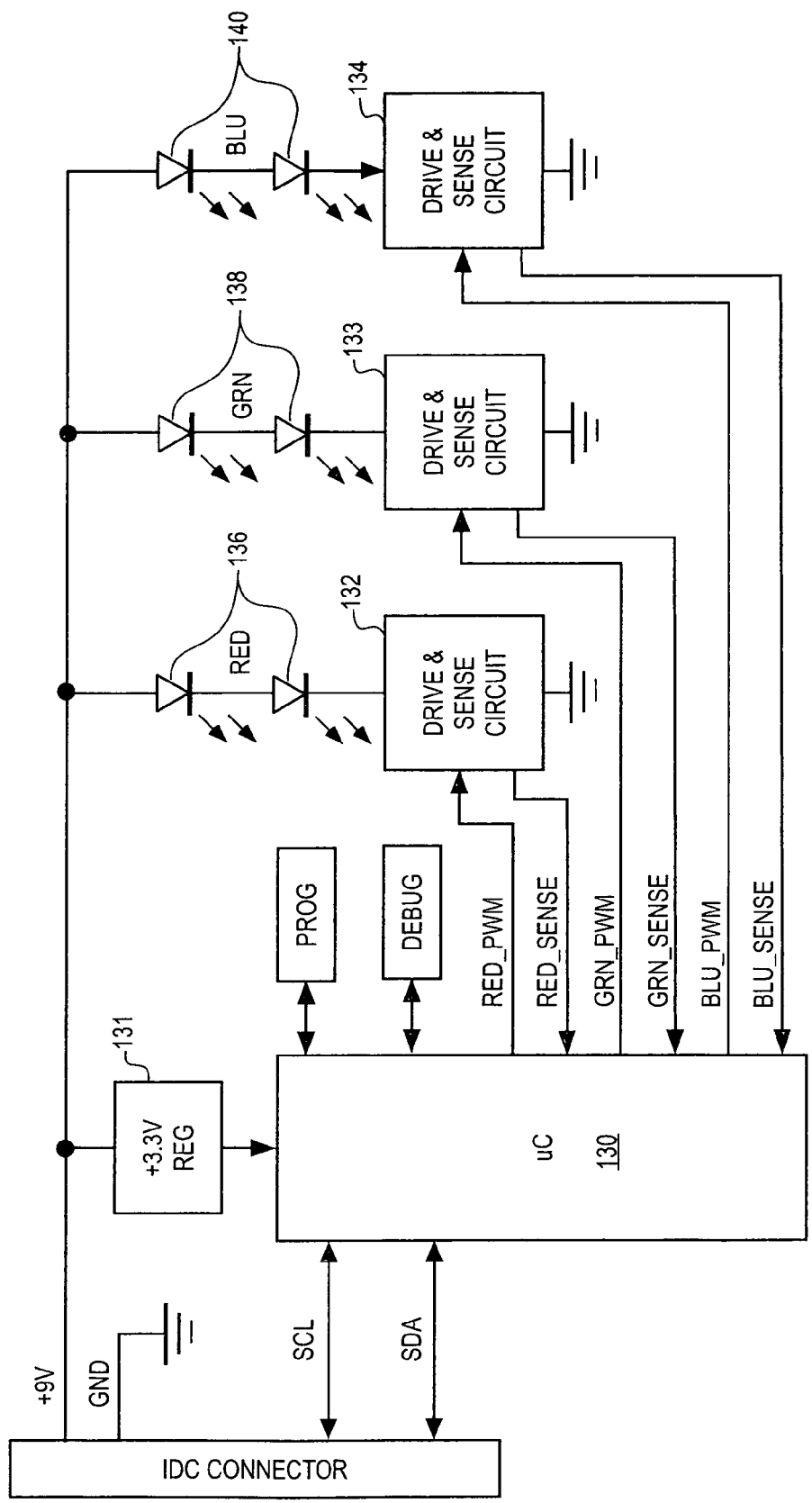
FIG. 7 is a block diagram of a slave LED module in accordance with the present invention.

FIG. 7 illustrates the structure of the slave LED modules 14. Each of the slave LED modules 14 includes a linear voltage regulator 131 that is responsive to the 9V from the associated master LED module to step down that rail voltage to 3.3V. Each slave module 14 also includes a micro-controller 130 that generates a red pulse width modulation (PWM) control signal, a green PWM control signal and a blue PWM control signal that are coupled to respective drive and sense circuits 132, 133 and 134. The drive and sense circuit 132 is coupled to the pair of red LEDs 136 of the slave module 14 for controlling the intensity of the red LEDs. The circuit 133 is coupled to a pair of green LEDs 138 of the slave module 14 and the circuit 134 is coupled to a pair of blue LEDs 140 of the slave module 14 to control the intensities of the respective green and blue LEDs. Each of the drive and sense circuits 132, 133 and 134 is depicted in detail in FIG. 8. As shown therein, the micro-controller 130 outputs a PWM control signal to drive the gate of a MOSFET 142 through a series limiting resistor 144. When the micro-controller 130 drives the gate of the MOSFET 142 high, the MOSFET 142 switches on, allowing current to flow through the LEDs 136. Once the voltage on the source resistor rises high enough to bias a transistor 146, the transistor 148 connected to the gate of the MOSFET 142 turns on, keeping the voltage from the source resistor from increasing any further. The values of the resistors 150 and 152 are the same. Moreover, the frequency of the PWM control signal is preferably on the order of 10 kHz. It is noted that the micro-controller 80 of the master LED modules controls the LEDs of the master module via the same drive and sense circuit depicted in FIG. 8.

The micro-controllers 80 and 130 of the master and slave modules have analog inputs to receive a red sense signal, a green sense signal and a blue sense signal. The micro-controllers monitor these sense signals to determine whether the respective LEDs are on or off. This information is included in the status information for each of slave and master LED modules 14 and 12. Each of the micro-controllers 80 and 130 also includes a built in temperature sensor that senses the temperature of the entire master module or slave module. A micro-controller may turn off the LEDs of a module if the temperature sensed for the module exceeds a predetermined limit.

FIG. 9 is a block diagram of a power hub in accordance with the present invention. For a display 10 having a height of 480 pixels, one power hub is provided for each display panel having sixteen columns of pixels. For a panel of half of the full height, i.e. a height of 240 pixels, one power hub is provided to supply the power for two adjacent display panels each, having sixteen columns of pixels. For a panel having a height of one quarter of a full height panel, i.e. a height of 120 pixels, one power hub can supply the power for four adjacent display panels each having sixteen columns. Each of the power hubs 160 converts three-phase A.C. to a rectified and filtered D.C. voltage of approximately 30V. No regulated power is provided by the power hub 160. The voltage regulation for the display 10 is provided by the switching voltage regulators in the master LED modules of the display and the linear regulators in the slave LED modules. Each power hub includes a transformer 162 that preferably has phase shifted windings and input voltage selection tabs. The transformer 162 receives the three-phase A.C. input via a three-phase breaker 164 and a main relay 166. For a soft start operation, the transformer 162 is also coupled to the three-phase breaker 164 via soft start resistors 168 and a soft start relay 169. The output of the transformer is coupled to a pair of three-phase bridge rectifiers 170 and 171. The outputs of the rectifiers 170 and 171 are coupled to a respective pair of clamped filter inductors 172 and 173, the outputs of which are coupled to damped output capacitors 174. The capacitors 174 are coupled to four D.C. output connectors 176 via sixty four D.C. circuit breakers 178. The four D.C. output connectors 176 provide sixteen D.C. power drives for each of the sixteen columns of a full height, 480 pixel display panel.

The power hub 160 also includes an auxiliary transformer 180 that is coupled to one phase of the A.C. input via a one-phase breaker 182. A supervisory and control board 184 monitors all of the sensors of the power hub as well as the voltage from the auxiliary transformer 180. Initially, the main relay 166 and the soft start relay 169 are open. If the supervisory and control board 184 detects any incorrect signal via the auxiliary transformer voltage 180, start up is aborted. If the signals are correct, the control 184 initially closes the soft start relay 169, the relays for the fans 186 and the relays for a strip heaters 188. The controls 184 also allows 24V to be applied to external logic at this time. At this stage, the capacitors 174 can charge up slowly. If the voltage ramps up too fast or does not reach the correct output voltage, the control 184 opens the soft start relay 169 and the start up is aborted. If the correct voltage is reached, the main relay 166 is closed and the soft start relay 169 is opened. At this point, the display 10 can be powered up.

It is noted that the strip heaters 188 are employed to drive out humidity to prevent unwanted conductive paths leading to shorts or shock hazards. These heaters are controlled by the supervisory and control board 184 so that the heaters 188 are only on when needed. The fans 186 provide cooling for the power hub 160. In a preferred embodiment, the fans have speed sensors to which the supervisory and control board 184 is responsive to provide a warning of impending fan failure. Thermostats 190 are provided for the heat sinks and magnetics of the power hub 160. The supervisory and control board 184 includes a temperature sensor so as to provide an early indication of overheating. If the temperature of the power hub 160 exceeds a predetermined level, the supervisory and control board 184 will turn off the main relay 166 to stop overheating. The supervisory and control board 184 will also continuously monitor the D.C. output voltage of the power hub 160. If the control 184 detects output voltages that are too high, the control 184 will open the main relay 166.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A display system comprising:
   a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected, wherein each data hub performs diagnostics for the one or more panels to which it is connected and monitors a status of its associated power hub.

2. The display system according to claim 1, wherein each data hub is connected to at least two pixel modules of each panel such that at least four pixel modules of each panel directly receive redundant pixel data for each pixel of the panel.

3. The display system according to claim 2, wherein each of the four pixel modules of the panel directly receiving redundant data from the data hubs distribute the received data to a plurality of other pixel modules of the panel.

4. The display system according to claim 3, wherein a plurality of pixel modules of the display are capable of receiving data directly from any one of four other pixel modules.

5. The display system according to claim 1, wherein the pixel modules of the display are aligned in columns and each data hub transfers the data to a panel column by column.

6. The display system according to claim 1, wherein the data provided by a data hub includes a column header identifying a column of the display followed by data for each pixel of the column.

7. The display system according to claim 6, wherein the data provided by the data hub includes a segment header following the column header, the segment header identifying a segment of pixel modules in the identified column, the segment header being followed by the data for each pixel module of the segment.

8. The display system according to claim 1, including:
a plurality of power hubs, each power hub converting A.C. power to D.C. power for at least one panel of the display.

9. The display system according to claim 1, wherein each data hub receives D.C. power from a power hub and distributes D.C. power from the power hub to the display.

10. A display system comprising:
a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module;

a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected; and a plurality of power hubs, each power hub converting A.C. power to unregulated D.C. power for at least one panel of the display, wherein each of a plurality of pixel modules in a first group includes a voltage regulator to convert the unregulated power to regulated power for a plurality of pixel modules in a second group, wherein each pixel module in the first group houses its own voltage regulator that includes a switching regulator to convert the unregulated power to regulated power for the plurality of pixel modules in the second group, and wherein each pixel module of the second group houses its own linear regulator.

11. The display system according to claim 10, wherein the voltage regulator includes at least one switching voltage regulator.

12. The display system according to claim 10, wherein each data hub is connected to at least two pixel modules of each panel such that at least four pixel modules of each panel directly receive redundant pixel data for each pixel of the panel.

13. The display system according to claim 12, wherein each of the four pixel modules of the panel directly receiving redundant data from the data hubs distribute the received data to a plurality of other pixel modules of the panel.

14. The display system according to claim 10, wherein a plurality of pixel modules of the display are capable of receiving data directly from any one of four other pixel modules.

15. The display system according to claim 10, wherein the pixel modules of the display are aligned in columns and each data hub transfers the data to a panel column by column.

16. The display system according to claim 10, wherein the data provided by a data hub includes a column header identifying a column of the display followed by data for each pixel of the column.

17. The display system according to claim 10, wherein the data provided by the data hub includes a segment header following the column header, the segment header identifying a segment of pixel modules in the identified column, the segment header being followed by the data for each pixel module of the segment.

18. A display system comprising:
a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected wherein a first data hub that is connected to a first display panel provides data for the entire display to a second data hub that is connected to a display panel to which the first data hub is not connected, wherein each data hub is directly connected to a different pixel module of the panel and each data hub is directly connected to at least two panels of the display to allow a data hub to provide pixel data for each pixel of the panels to which the data hub is connected.

19. The display system according to claim 18, wherein a third data hub that is connected to a second display panel provides data for the entire display to a fourth data hub.

20. The display system according to claim 19, wherein the fourth data hub is connected to a display panel to which the third data hub is not connected.

21. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module;

a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected; and a plurality of power hubs, each power hub converting A.C. power to unregulated D.C. power for at least one panel of the display, wherein each of a plurality of pixel modules in a first group includes a voltage regulator to convert the unregulated power to regulated power for a plurality of pixel modules in a second group, wherein each data hub is directly connected to a different pixel module of the panel and each data hub is directly connected to at least two panels of the display to allow a data hub to provide pixel data for each pixel of the panels to which the data hub is connected.

22. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module;

a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected; and a plurality of power hubs, each power hub converting A.C. power to unregulated D.C. power for at least one panel of the display, wherein each of a plurality of pixel modules in a first group includes a voltage regulator to convert the unregulated power to regulated power for a plurality of pixel modules in a second group, wherein each data hub performs diagnostics for the one or more panels to which it is connected and monitors a status of its associated power hub.

23. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected, wherein each data hub is directly connected to a different pixel module of the panel and each data hub is directly connected to at least two panels of the display to allow a data hub to provide pixel data for each pixel of the panels to which the data hub is connected.

24. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected, wherein each pixel module in a first group houses its own voltage regulator that includes a switching regulator to convert unregulated power to regulated power for the plurality of pixel modules in a second group, and wherein each pixel module of the second group houses its own linear regulator.

25. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected wherein a first data hub that is connected to a first display panel provides data for the entire display to a second data hub that is connected to a display panel to which the first data hub is not connected, wherein each data hub performs diagnostics for the one or more panels to which it is connected and monitors a status of its associated power hub.

26. A display system comprising:

a plurality of display panels, wherein each panel is formed of a two dimensional array of LED pixel modules, each pixel module having a housing supporting a plurality of multi-color LEDs, wherein each pixel module houses its own controller responsive to received pixel data to control the intensity of the LEDs of the module; and a plurality of data hubs, each display panel being connected to at least two data hubs to allow a display panel to receive pixel data for each pixel of the panel from one or more of the data hubs to which it is connected, each data hub being connected to a different pixel module of the panel and each data hub being connected to at least two panels of a display to allow a data hub to provide pixel data for each pixel of the panels to which the data hub is connected wherein a first data hub that is connected to a first display panel provides data for the entire display to a second data hub that is connected to a display panel to which the first data hub is not connected, wherein each pixel module in a first group houses its own voltage regulator that includes a switching regulator to convert unregulated power to regulated power for the plurality of pixel modules in a second group, and wherein each pixel module of the second group houses its own linear regulator.

* * * * *